(12) United States Patent
Radan et al.

(10) Patent No.: US 12,268,996 B2
(45) Date of Patent: Apr. 8, 2025

(54) GAS-SATURATED LIQUID GENERATOR

(71) Applicant: NUTRISTAMINA s.r.o., Ostrava-Vyskovice (CZ)

(72) Inventors: Gocal Radan, Trojanovice (CZ); Pes Ladislav, Ostrava-Vyskovice (CZ)

(73) Assignee: NUTRISTAMINA s.r.o., Ostrava-Vyskovice (CZ)

( * ) Notice: Subject to any disclaimer, the term of this patent is extended or adjusted under 35 U.S.C. 154(b) by 364 days.

(21) Appl. No.: 17/945,874

(22) Filed: Sep. 15, 2022

(65) Prior Publication Data
US 2023/0097361 A1    Mar. 30, 2023

(30) Foreign Application Priority Data
Sep. 30, 2021  (CZ) ................ CZ2021-460

(51) Int. Cl.
*B01F 23/23*    (2022.01)
*B01F 23/20*    (2022.01)
*B01F 23/233*   (2022.01)
*B01F 23/235*   (2022.01)
*B01F 23/237*   (2022.01)
*B01F 27/96*    (2022.01)
*B01F 33/453*   (2022.01)
*B01F 35/53*    (2022.01)

(52) U.S. Cl.
CPC ........ *B01F 23/2351* (2022.01); *B01F 23/233* (2022.01); *B01F 23/2331* (2022.01); *B01F 23/23313* (2022.01); *B01F 23/23351* (2022.01); *B01F 23/237612* (2022.01); *B01F 23/237613* (2022.01); *B01F 23/23764* (2022.01); *B01F 23/291* (2022.01); *B01F 27/96* (2022.01); *B01F 33/4533* (2022.01); *B01F 35/53* (2022.01)

(58) Field of Classification Search
CPC .... B01F 23/23; B01F 23/233; B01F 23/2331; B01F 23/23313; B01F 23/23351
See application file for complete search history.

(56) References Cited

U.S. PATENT DOCUMENTS 4,290,885 A * 9/1981 Kwak ................ C02F 3/207
                                                          210/197
2013/0043124 A1    2/2013 Park et al.

FOREIGN PATENT DOCUMENTS

JP         4801877 B2    10/2011

* cited by examiner

*Primary Examiner* — Robert A Hopkins
(74) *Attorney, Agent, or Firm* — NOTARO, MICHALOS & ZACCARIA P.C.

(57) ABSTRACT

A gas-saturated liquid generator having a vessel of the generator, a hollow bell in its upside down position located with a tube for gas supply, and a mixer situated in the area for saturated liquid covered by the bell is disclosed. The entire bell is submerged below the surface of the saturated liquid. On a shaft projecting from a driving equipment, the mixer provided with a foaming spring is situated. The mixer provided with a magnetic carrier seated rotatably on the protrusion formed by a bulge in the bottom part of the generator vessel may be used. The preferred bell forms are dome-shaped, cylindrical or conical.

11 Claims, 7 Drawing Sheets

GAS-SATURATED LIQUID GENERATOR

FIELD OF INVENTION

The presented invention relates to a gas-saturated liquid generator, saturated in particular with hydrogen, oxygen or ozone.

BACKGROUND OF THE INVENTION

Currently, a great emphasis is put on a healthy lifestyle, which is essential for decreasing many health issues. One of the sought-after options how to improve and support health is the use of various liquid types, especially drinking water, saturated with gas, in particular with hydrogen, oxygen or ozone.

Hydrogen significantly helps to treat metabolic disorders, dementia, inflammation and a number of other health complications. With its antioxidant effects, it boosts immunity and resistance. Therefore, so-called hydrogen water made of drinking water saturated with hydrogen has been attracting attention recently. For its undeniable health advantages, a high emphasis is put on the highest percentage of the hydrogen contained in the water.

Oxygen is used to increase body activity, reduce fatigue, and improve brain activities and total organism regeneration. Common drinking water contains 7-9 mg/l of oxygen, and after saturation, the value of 120 mg/l can be reached.

Ozone is used for water disinfection and destruction of pathogens, e.g. when washing fruits and vegetables with ozone-saturated water.

With respect to the effects of the saturated liquids, in particular drinking water, with gases, increased requirements for the use of devices generating saturated liquids in domestic conditions occur. With these devices, the emphasis is mainly on safety, efficiency and size.

To saturate liquid with gas, in particular with ozone, oxygen, hydrogen, or other gases, commonly available diffusers are often used. They are made of a tube ended with a diffusion element or an outlet with a perforated membrane for supplying gas to the liquid. The diffuser connected to the tube for gas supply is freely submerged at the bottom of the vessel with liquid. Depending on the type of material which the diffuser is made of, the gas is pressed via its porous surface to the liquid in the form of bubbles having different sizes.

To get liquid saturated with hydrogen or oxygen, electrolytic cells where gaseous oxygen and hydrogen are produced using water electrolysis are also used these days. By dispersing the bubbles of gases thus formed into water, its saturation occurs.

The patent application of the invention US20130043124 is known, the solution of which represents a portable gas generator formed by an electrolytic cell with a membrane for separating cathode and anode parts of the cell, a tank for water supply using a tube to the anode part, further a generated gas inlet which leads into the bottom part of the vessel with water for saturation and solid circular discs attached in the middle of the vessel with water, on the bottom of which the electrolytic cell with the membrane is placed. The membrane is made of solid polymeric electrolyte, wherein hydrogen is subsequently released into the water in the vessel from the cathode part of the cell. Solid circular discs are designed for capturing the ascending hydrogen bubbles. In case the generator for water saturation with oxygen is concerned, the anode part is interchanged with the cathode one and vice versa, wherein the oxygen is then supplied to the water in the vessel.

The patent application of the invention JP4801877 describes a hydrogen generator which contains a vessel for saturated liquid, in particular water, an electrolytic cell submerged into water and a driving equipment in the form of an electric motor for a mixing shaft, further a beam with an arm to which the electrolytic cell and the mixing shaft are attached. The mixing shaft is provided with paddles in its bottom part and is located in the vessel. During mixing and water circulation, the hydrogen being released from the cathode and the oxygen being released from the anode of the electrolytic cell is swept away by the movement of the water which results in decreasing the number of emerging larger bubbles and simultaneous increasing the number of small bubbles. This increases the saturation efficiency since large bubbles tend to escape from the water whereas small bubbles disperse better in water and so dispersed, they stay in it.

A big disadvantage of the said state of the art is gradual joining of individual ascending gas bubbles into larger ones and their subsequent leakage from the liquid surface. This leads to the decrease of the total gas concentration in the liquid, increase of the needed amount of the supplied gas and simultaneously to elongating the time necessary for reaching the requested saturation levels. With respect to the size of the contained bubbles, immediate consumption of the saturated liquid is necessary since the dispersed gas amount decreases rapidly. Another disadvantage is relatively frequent fouling of electrodes, the diffuser or the perforated membrane with minerals and impurities contained in the saturated liquid. The efficiency of the saturated water is then significantly decreased and at the same time, it is difficult to keep the equipment hygienically clean.

SUMMARY OF THE INVENTION

The above stated disadvantages are eliminated by a gas-saturated liquid generator, in particular with hydrogen, oxygen or ozone, comprising a liquid vessel, at least one tube for supplying gas and at least one driving equipment with a mixer according to the invention, the essence of which is that a hollow bell in its upside down position is located in the area for the saturated liquid, and a mixer located in the area covered by this bell. The covered area means the area in the vessel inside the bell cavity and below, i.e. below the bell cavity.

If the saturated liquid is present, the whole bell will be preferably located under the liquid surface.

In its upper part, the bell has preferably at least one drain hole for venting air accumulated in the bell area during immersion above the surface of the saturated liquid. At the same time, this hole supports liquid circulation in the whole vessel volume.

The mixer is preferably located on a shaft projecting from the driving equipment.

The bell may be preferably provided with a pass-through opening for the mixer shaft.

The mixer is preferably provided with a foaming spring in its bottom end part.

Alternatively, the bottom part of the vessel is provided with an inwardly protruding bulge, wherein the mixer is provided with at least one magnetic carrier. Together with this magnetic carrier, it is located rotatably on a protrusion formed in the vessel by the bulge.

Outside the vessel, preferably at least one magnet is located in the area of the bulge securing the movement of the magnetic carrier, wherein the driving equipment is located below the bulge and the magnet is attached to the shaft projecting from this driving equipment.

The mixer is preferably situated in the bell cavity. The resulting vortex is realized primarily in the bell cavity. The air is not sucked in from the area above the liquid surface which is not covered by the bell body.

Alternatively, the mixer is situated below the bell cavity which is used in particular at the mixer speed lower than 2,000 rpm when the vortex is realized also mainly in the bell cavity and the air is not sucked in from the area above the liquid surface which is not covered by the bell body.

In a preferred embodiment, the bell has a dome-shaped form.

In another embodiment, the bell has a cylindrical form.

In another equivalent embodiment, the bell has a cone-shaped form.

The presented invention of the generator is suitable for use in households, also as a portable device. Micro and nano gas bubbles formed in the liquid are stable and their immediate escape from the liquid surface does not occur. With respect to the fact that no electrolysis form occurs in the liquid, not only drinking water can be used as the liquid, but also juices, coffees, teas and other kinds of beverages, which increases the attraction of its use in a common fluid intake.

The advantage of the presented invention is its easy maintenance and cleaning. Other indisputable advantages include significantly lower consumption of the used gas with simultaneous shortening of time necessary for liquid saturation. For example, when saturating liquid with the volume of 400 ml with hydrogen, the liquid is saturated within 20-30 seconds.

The use of the generator is easy, does not require any special vessel type, and the surface height of the saturated liquid is also not determined.

DETAILED DESCRIPTION OF THE SUBJECT TECHNOLOGY

Examples of the embodiments of the presented invention of the gas-saturated liquid generator, in particular with hydrogen, oxygen or ozone, are stated in FIGS. 1 to 7.

Figure 1:
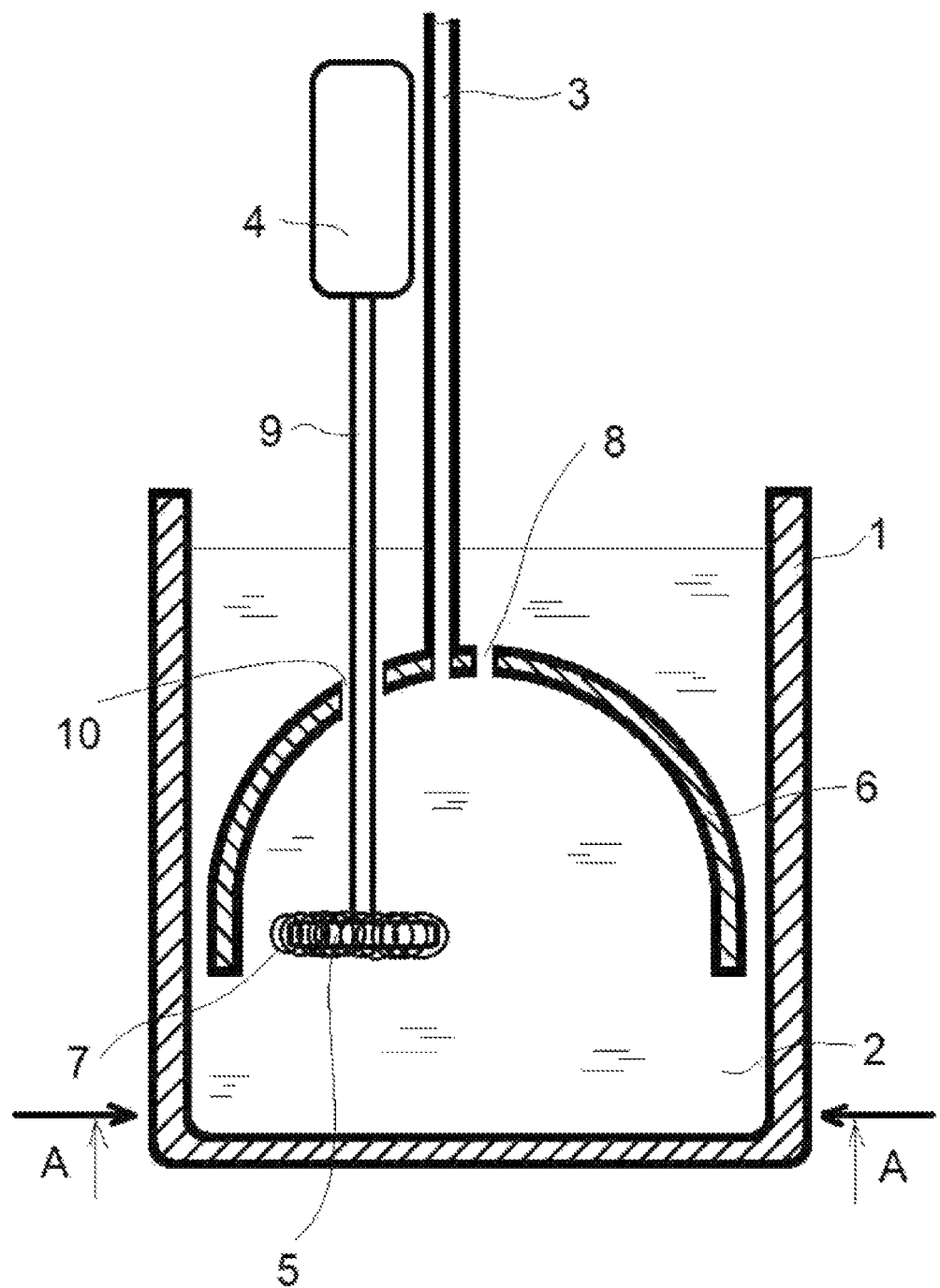
FIG. 1 depicts a section through a generator with a dome-shaped bell with a pass-through opening for a mixer with a foaming spring and with a drain hole.
Figure 2:
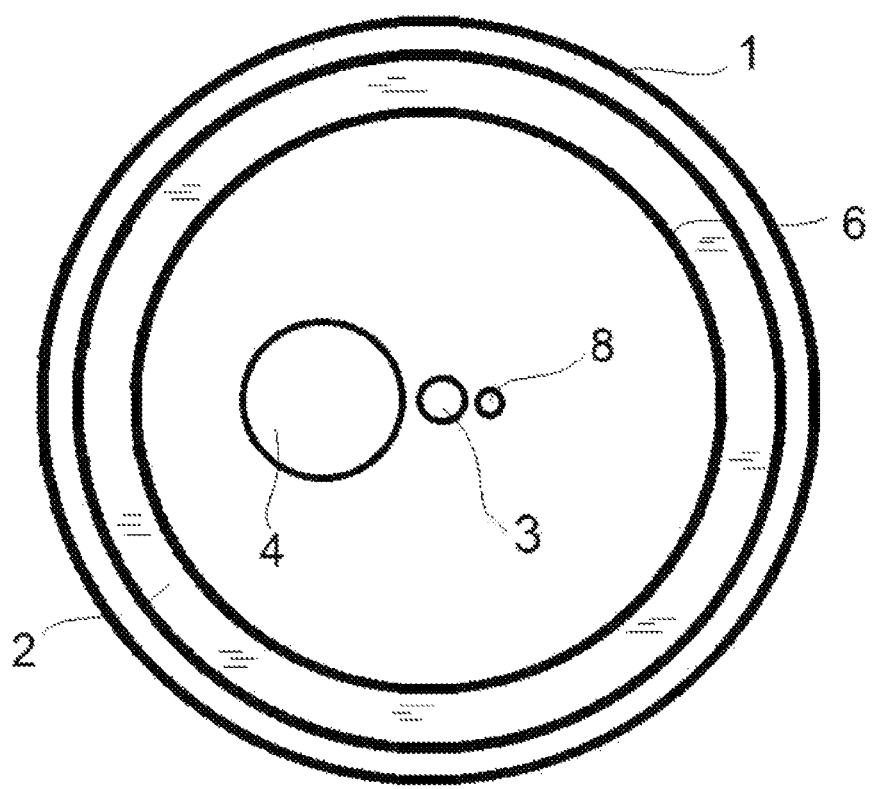
FIG. 2 depicts a top view of the generator according to the previous figure.
Figure 3:
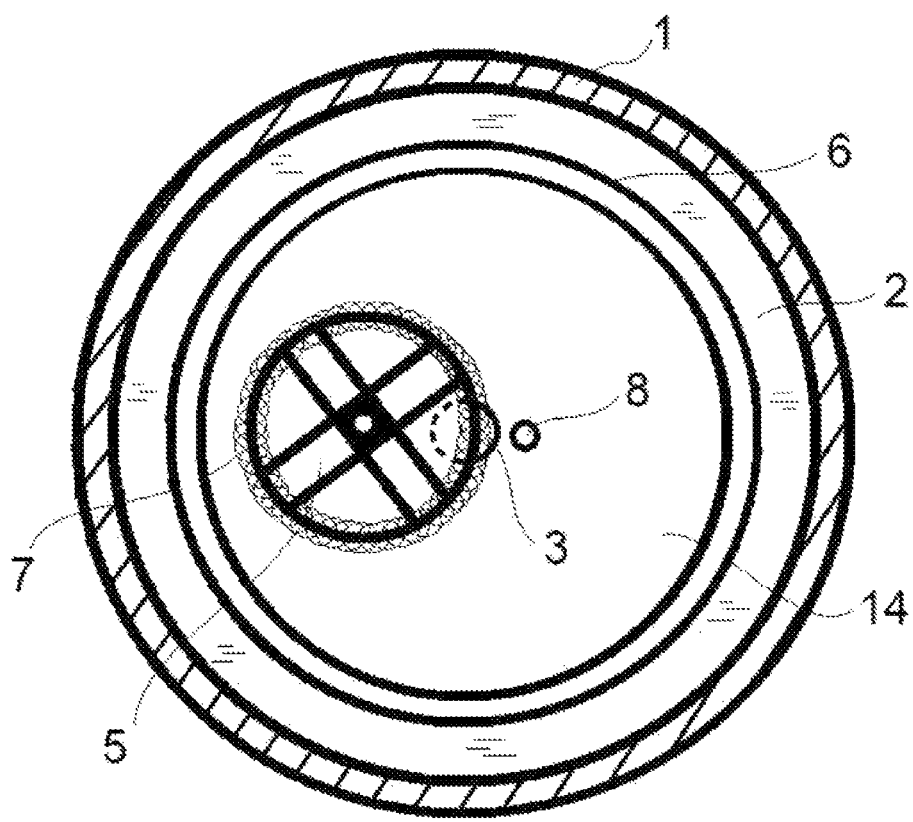
FIG. 3 depicts a bottom view of the generator according to FIGS. 1 and 2 in A-A section indicated in FIG. 1.

FIGS. 1 to 3 show by way of example the optimal design of the gas-saturated liquid generator with a bell 6 having a dome-shaped form. The presented gas-saturated liquid generator is formed by a vessel 1 for liquid 2, a tube 3 for supplying gas and a driving equipment 4 with a mixer 5. In the vessel 1 in the area for the saturated liquid 2, a hollow bell 6, which prevents sucking air from the area above the liquid 2 surface, is located. The bell 6 is in its upside down position and the mixer 5 is located in the area covered by this bell 6. If the saturated liquid 2 is present in the vessel 1, the whole bell 6 is located under its surface. The driving equipment 4 of the mixer 5 is located above the vessel 1, while the mixer 5 is located on a shaft 9 projecting from the driving equipment 4, off the vertical axis of the bell 6. In this embodiment, the mixer 5 is provided with a foaming spring 7 in its bottom end part. In its upper part, the bell 6 has a drain hole 8 for venting air accumulated under the bell during immersion above the surface of the saturated liquid 2, and is also provided with a pass-through opening 10 for the shaft 9 of the mixer 5. FIG. 2 represents a top view of the generator body and FIG. 3 represents the bottom view. The dome-shaped form of the bell 6 enables its easy cleaning and efficient venting the accumulated air during immersion at the highest point of the bell 6 body above the liquid 2 surface by the drain hole 8. At the same time, it represents the optimal version of the formed vortex in the area of the bell 6 cavity 14.

Figure 4:
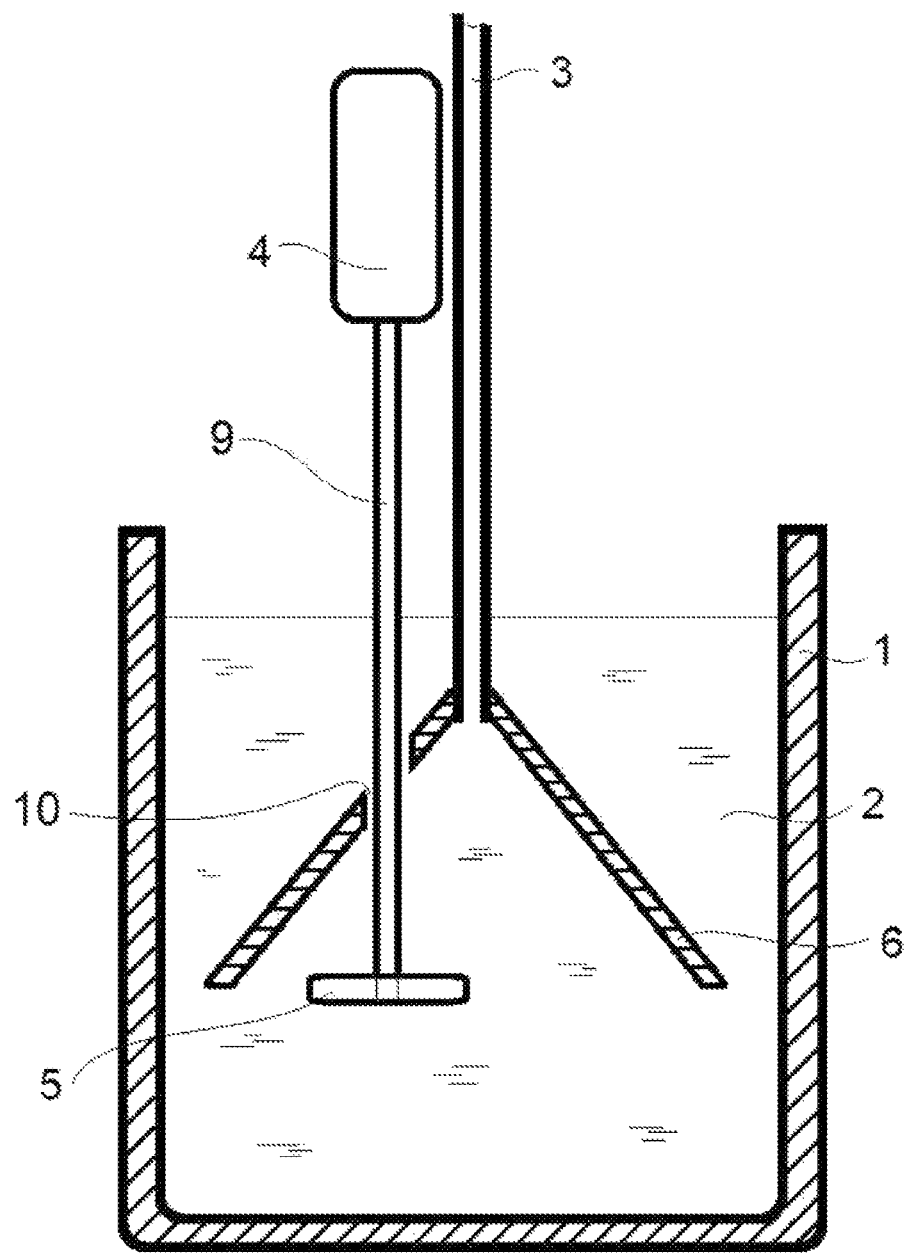
FIG. 4 depicts a section through a generator with a cone-shaped bell with a pass-through opening for a mixer.

FIG. 4 represents the version of the generator where the bell 6 has a cone shape and is provided with the pass-through opening 10 for the shaft 9 of the mixer 5. The driving equipment 4 is located above the vessel 1 and the mixer 5 is situated in the cavity 14 of the bell 6. When submerging the bell 6 body under the liquid 2 surface, the air accumulated in the bell 6 area is gradually pressed out by the saturating gas which accumulates at the top of the dome-shaped cavity 14 of the bell 6.

Figure 5:
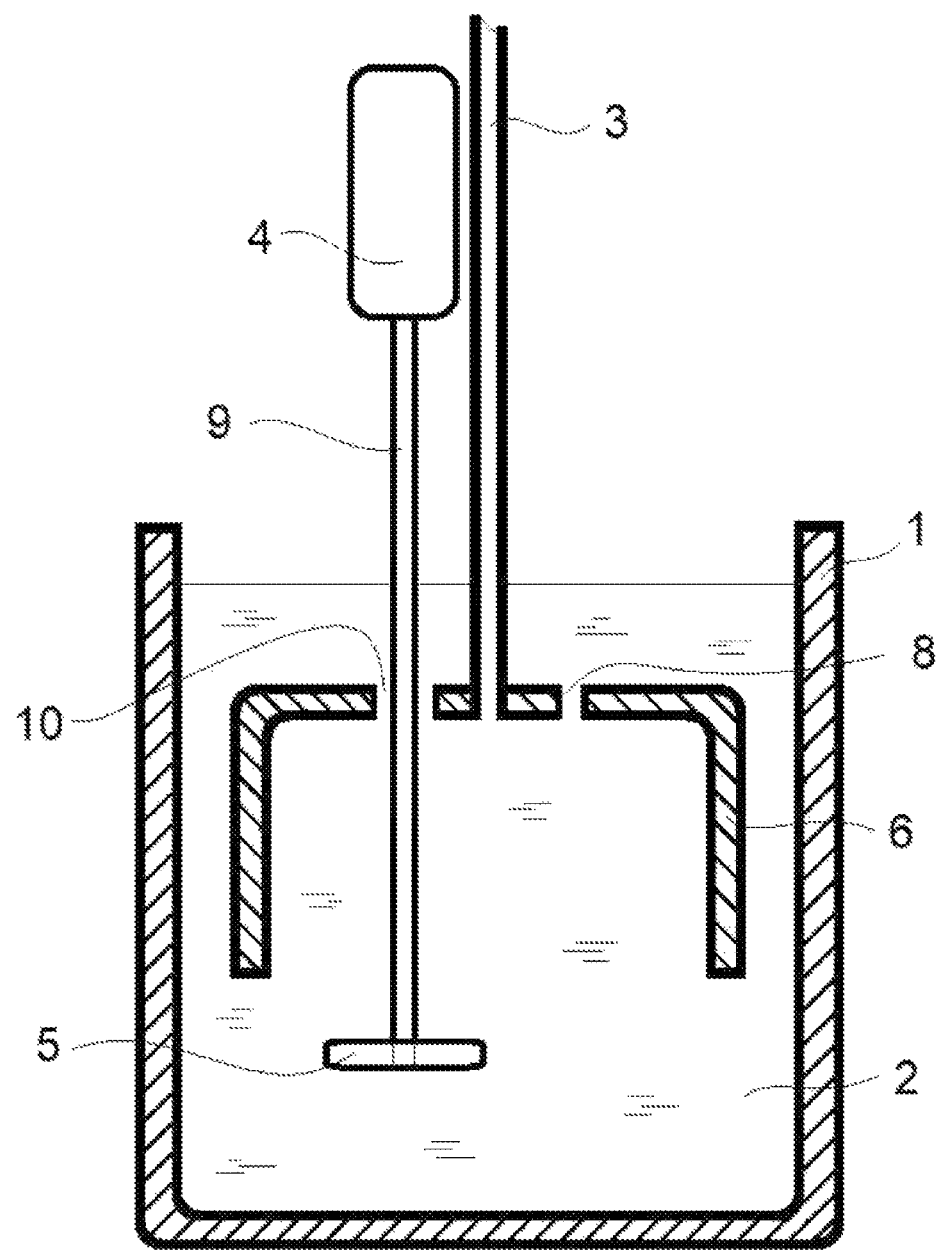
FIG. 5 depicts a section through a generator with a cylindric-shaped bell with a pass-through opening for a mixer and with a drain hole.

FIG. 5 alternatively depicts a generator where the bell 6 has a cylindrical shape and the drain hole 8 for venting air in its top part in this embodiment. The accumulated air is pressed to the highest point of the bell 6 and escapes using the drain hole 8 for venting the air above the liquid 2 surface. The bell 6 body in this alternative embodiment provides an area with the largest cavity 14 volume for the formed vortex.

Figure 6:
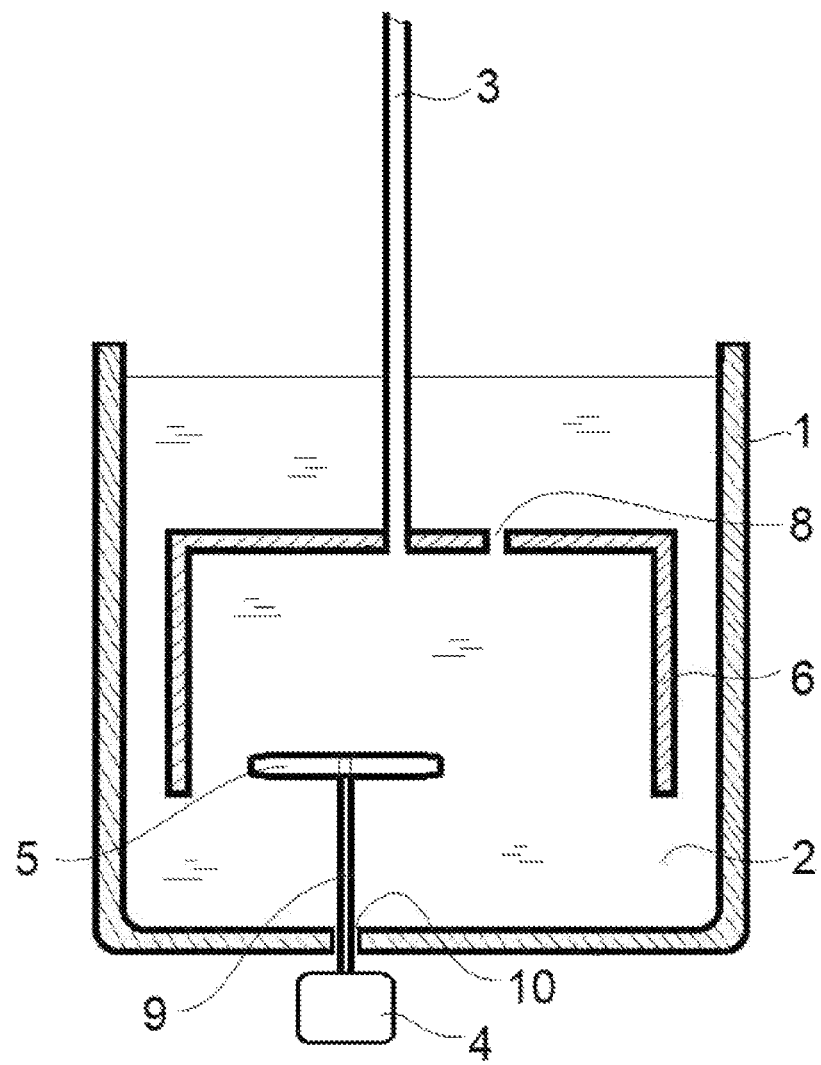
FIG. 6 depicts a section through the generator with the bell of the cylindrical shape, with a drain hole in the bell body and a pass-through opening for a shaft in the bottom part of the generator body.

Another example of the embodiments of the presented invention is represented by a generator in FIG. 6. The vessel 1 of the generator is provided with the pass-through opening 10 for the shaft 9 of the mixer 5 in its bottom part. The bell 6 has a cylindrical shape with the drain hole 8 in its upper part. The driving equipment 4 is located outside the bottom vessel 1 part in this exemplary embodiment. With respect to the absence of the pass-through opening 10 for the shaft 9 of the mixer 5 in the bell 6 body, easier and safer bell 6 handling is enabled, including its maintenance and cleaning.

Figure 7:
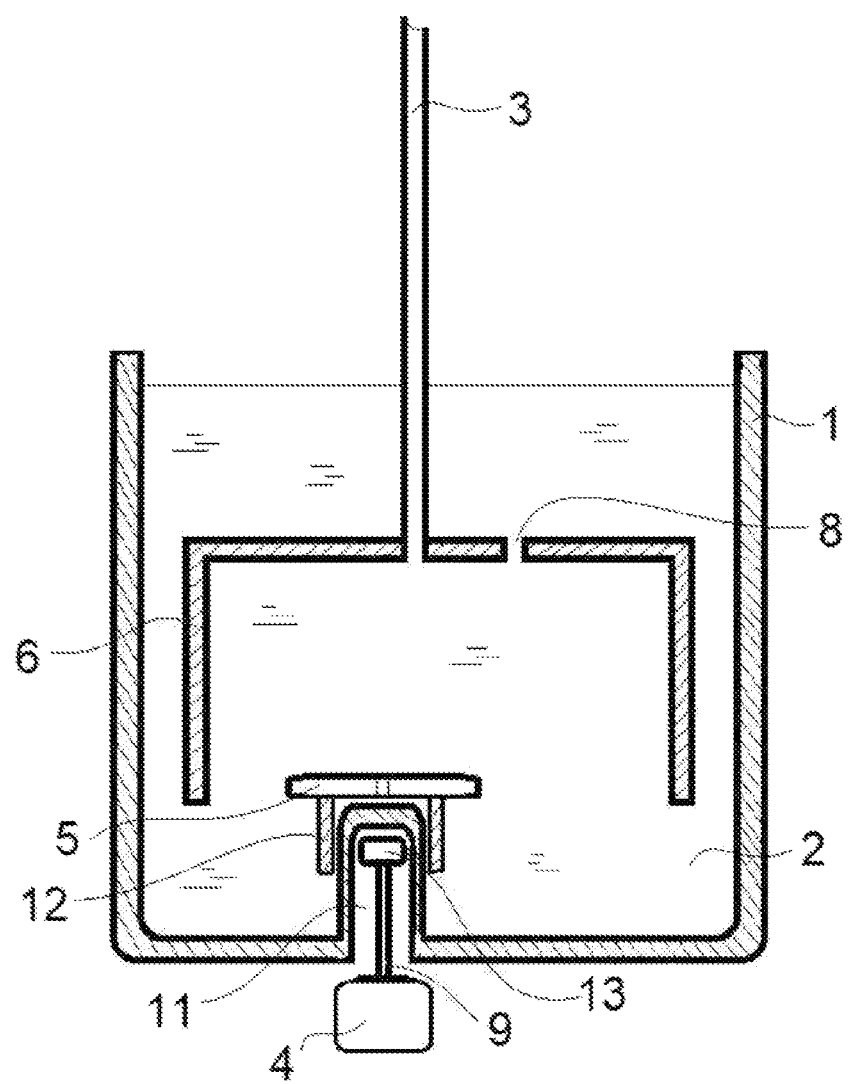
FIG. 7 depicts a section through the generator with the bell of the cylindrical shape, with a drain hole in the bell body and a bulge in the bottom part of the generator body.

As can be seen in FIG. 7, a gas-saturated liquid generator where the bottom vessel 1 part is provided with an inwardly protruding bulge 11 is depicted in this alternative embodiment. The mixer 5 is provided with a magnetic carrier 12. Together with this magnetic carrier 12, it is located rotatably on the protrusion formed by the bulge 11. Outside the vessel 1, a magnet 13 is also located in the bulge 11 area to secure the movement of the magnetic carrier 12. The driving equipment 4 is located below the bulge 11 and the magnet 13 is fastened to the shaft 9 projecting from the driving equipment 4. As well as in the previous example, also here the absence of the opening 10 for the shaft 9 of the mixer 5 in the bell 6 body enables easier and safer bell 6 handling, including its maintenance and cleaning. The mixer 5 body is easily removable for its possible replacement or cleaning.

By way of illustration, we present the mixer 5 speed that reaches 100 rpm. Greater efficiency is reached at the speed of 3,000 rpm and more. By rotating the mixer 5, a vortex causing a negative pressure helping to draw in the saturating gas and retain it under the area of the bell 6 is formed in the area below the bell 6 which results in continuous liquid 2 saturation with gas in the form of micro and nano bubbles.

The presented invention has a number of versions in particular with respect to the combination of the bell 6 shape, mixer 5 location not only in the vessel 1 area but also outside it, use of the foaming spring 7, the number of drain holes 8 and the number of tubes 3 for the supply of the saturating gas. Their mutual combinations can affect the resulting efficiency of saturating the liquid 2 with gas.

The drain hole 8 for venting the air above the liquid 2 surface can be, by the way of example, provided with a check valve preventing back-suction of air below the bell 6 area. The back suction of air can be avoided by keeping a sufficiently high surface level of the fluid 2 above the drain hole 8 for venting air when the liquid 2 surface is exemplarily higher than 5 mm. It is understood that the individual implementations of the solution described here are represented for illustrative purposes not as limitations of the invention to enumeration of the embodiment examples given here.

The generator according to the invention can be used for production of liquid saturated with gas, in particular with hydrogen, oxygen or ozone for domestic use and as a portable device.

What is claimed is:

1. A gas-saturated liquid generator, comprising:
   a vessel (1) for a liquid (2);
   at least one tube (3) for supplying gas;
   at least one driving equipment (4) with a mixer (5); and
   a hollow bell (6) located in the vessel (1) in an area for the liquid (2),
   wherein the bell (6) has a wide open end facing downwards and wherein the mixer (5) is located in an area covered by the bell (6); and
   at least one drain hole (8) in the hollow bell (6) for venting air that accumulates above the surface of the liquid (2).

2. The gas-saturated liquid generator according to claim 1, wherein the hollow bell (6) is located completely under a surface of the liquid (2) when the liquid (2) is present in the vessel (1).

3. The gas-saturated liquid generator according to claim 1, wherein the mixer (5) is positioned in a cavity (14) of the bell (6).

4. The gas-saturated liquid generator according to claim 1, wherein the mixer (5) is positioned below a lower level of a cavity (14) of the bell (6).

5. The gas-saturated liquid generator according to claim 1, wherein the bell (6) has a dome-shaped form.

6. The gas-saturated liquid generator according to claim 1, wherein the bell (6) has a cylindrical form.

7. The gas-saturated liquid generator according to claim 1, wherein the bell (6) has a cone-shaped form.

8. A gas-saturated liquid generator, comprising:
   a vessel (1) for a liquid (2);
   at least one tube (3) for supplying gas;
   at least one driving equipment (4) with a mixer (5);
   a hollow bell (6) located in the vessel (1) in an area for the liquid (2),
   wherein the bell (6) has a wide open end facing downwards and wherein the mixer (5) is located in an area covered by the bell (6);
   wherein the mixer (5) is located on a shaft (9) projecting from the driving equipment (4); and
   wherein the mixer (5) has a foaming spring (7).

9. The gas-saturated liquid generator according to claim 8, wherein the bell (6) has a pass-through opening (10) for the shaft (9) of the mixer (5).

10. The gas-saturated liquid generator, comprising:
    a vessel (1) for a liquid (2);
    at least one tube (3) for supplying gas;
    at least one driving equipment (4) with a mixer (5);
    a hollow bell (6) located in the vessel (1) in an area for the liquid (2);
    wherein the bell (6) has a wide open end facing downwards and wherein the mixer (5) is located in an area covered by the bell (6); and
    wherein the vessel (1) has an inwardly protruding bulge (11) at a bottom part thereof, wherein the mixer (5) has at least one magnetic carrier (12) and together with the magnetic carrier (12), the mixer (5) is located rotatably on a protrusion formed in the vessel (1) by the inwardly protruding bulge (11).

11. The gas-saturated liquid generator according to claim 10, comprising a magnet (13) located outside the vessel (1) in an area of the inwardly protruding bulge (11) to secure movement of the magnetic carrier (12), wherein the driving equipment (4) is located under the inwardly protruding bulge (11) and the magnet (13) is fastened to a shaft (9) projecting from the driving equipment (4).

* * * * *